United States Patent
Shirakawa

[11] Patent Number: 5,961,015
[45] Date of Patent: Oct. 5, 1999

[54] UMBRELLA SUPPORT ATTACHMENT FOR BICYCLE

[75] Inventor: Masahiro Shirakawa, Suita, Japan

[73] Assignee: MAC Corporation, Osaka, Japan

[21] Appl. No.: 08/903,006

[22] Filed: Jul. 30, 1997

[30] Foreign Application Priority Data

Jul. 31, 1996 [JP] Japan .................................... 8-219411

[51] Int. Cl.$^6$ ................................................... B62J 11/00
[52] U.S. Cl. ........................ 224/442; 224/448; 224/459; 224/461; 224/426; 224/915
[58] Field of Search .................... 224/412, 441, 224/442, 443, 445, 460, 454, 456, 459, 461, 915, 425, 426

[56] References Cited

U.S. PATENT DOCUMENTS

| 492,740   | 2/1893 | Copeland  | 224/442 |
| 503,315   | 8/1893 | Gendron   | 224/448 |
| 553,614   | 1/1896 | Handloser | 224/443 |
| 1,413,530 | 4/1922 | Harned    | 224/448 |
| 3,648,908 | 3/1972 | Thompson  | 224/442 |
| 3,659,761 | 5/1972 | Wesson    | 224/442 |
| 5,144,546 | 9/1992 | Burdi     | 224/448 |

FOREIGN PATENT DOCUMENTS

| 365024 | 11/1938   | Italy          | 224/39 R |
| 223688 | 9/1942    | Switzerland    | 224/39 R |
| 9567   | of 1897   | United Kingdom | 224/30 R |
| 17861  | of 1902   | United Kingdom | 224/32 R |

*Primary Examiner*—Gregory M. Vidovich
*Attorney, Agent, or Firm*—Griffin, Butler, Whisenhunt & Szipl, LLP

[57] ABSTRACT

An umbrella support attachment for a bicycle is provided which comprises a distal portion support member including a fastening portion to be attached to a seat stay of the bicycle and a support portion for supporting a distal portion of the umbrella, and a proximal portion support member including a fastening portion to be attached to a frame bar of the bicycle and a clipping portion for supporting a proximal portion of the umbrella. The umbrella support attachment is effective to carry an elongate object such as an umbrella on a bicycle without interfering with the operation of the bicycle and smooth movement of movable components of the bicycle.

3 Claims, 6 Drawing Sheets

UMBRELLA SUPPORT ATTACHMENT FOR BICYCLE

BACKGROUND OF THE INVENTION

1. Field of the Invention

The present invention relates to an umbrella support attachment for a bicycle, which includes two simple members to be attached to the bicycle for fastening an umbrella to the bicycle for carriage thereof without interfering with operation of the bicycle.

2. Description of Related Art

Where baggage is to be carried on a bicycle, the baggage is generally put in a front basket of the bicycle or fastened on a rear rack of the bicycle. However, the front basket and the rear rack each have a limited size and, therefore, are not suitable for carrying a large piece of baggage or an elongate object. An umbrella often needs to be carried on the bicycle, for example, after a rain. However, the front basket cannot accommodate the long umbrella. If the umbrella is mounted on the rear rack, a great portion of the umbrella projects from the bicycle thereby to interfere with safe traveling of the bicycle.

Even with such inconvenience, bicycles do not have a portion adapted to hold an umbrella or a like elongate object, nor a special device for holding an umbrella.

It is often necessary to carry an umbrella on a bicycle, for example, after a rain. This presents problems associated with means for holding an umbrella for carriage thereof. In most cases, a rider operates a bicycle with an umbrella held by one hand and a handlebar of a bicycle held by the other hand. Alternatively, the umbrella is somehow fastened to a frame of the bicycle. However, such approaches cause inconvenience in the operation of the bicycle and are therefore dangerous. In addition, smooth movement of movable components such as pedals and a handlebar of the bicycle is hindered, causing a trouble in the operation of the bicycle. Further, the umbrella may come off during the traveling of the bicycle.

To solve such problems, it is an object of the present invention to provide an umbrella support attachment for a bicycle, which can assuredly fasten an elongate object such as an umbrella to the bicycle for carriage thereof while ensuring smooth movement of all movable components of the bicycle without interfering with the operation of the bicycle.

SUMMARY OF THE INVENTION

As a result of intensive studies to solve the aforesaid problems, the inventors of the present invention have found that an umbrella can be fastened to a bicycle with the use of two support members provided on a seat stay and a frame bar of the bicycle for holding the umbrella without interfering with operation of the bicycle and smooth movement of movable components of the bicycle.

In accordance with one aspect of the present invention, there is provided an umbrella support attachment for a bicycle, which comprises a distal portion support member including a fastening portion to be attached to a seat stay of the bicycle and a support portion for supporting a distal portion of the umbrella, and a proximal portion support member including a fastening portion to be attached to a frame bar of the bicycle and a clipping portion for supporting a proximal portion of the umbrella.

Figure 5:
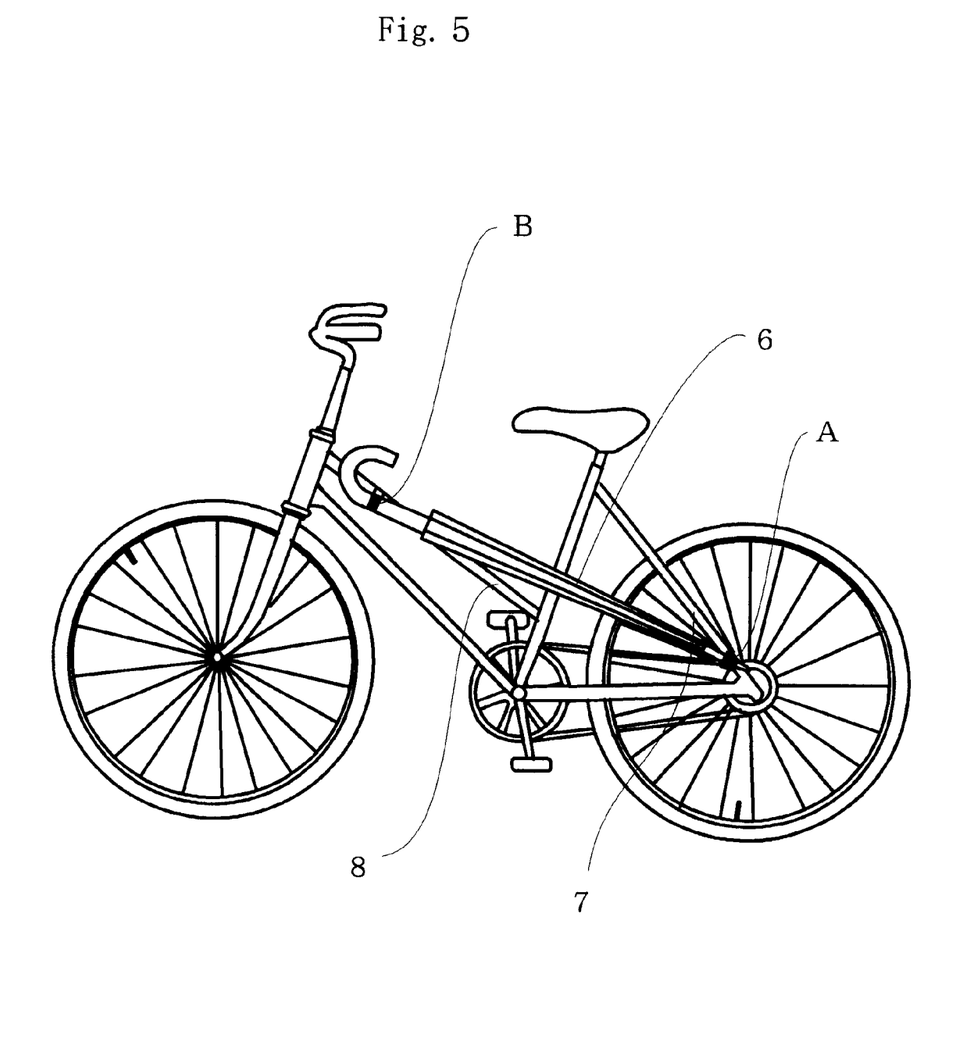
FIG. 5 is a front view illustrating a state where an umbrella is fastened to a bicycle by using an umbrella support attachment according to the present invention.

The seat stay herein means a frame portion extending from an under portion of a saddle to a hub of a rear wheel and designated, for example, by a reference numeral 7 in FIG. 5. The frame bar herein means a frame portion, i.e., a cross bar or a down tube, disposed between a head tube and a seat tube. Particularly, the frame bar differs in configuration depending on the bicycle type and, therefore, should be construed in a broader sense. The frame bar is indicated, for example, by a reference numeral 8 in FIGS. 5 to 8.

In consideration of the umbrella support stability, the two support members are provided at two different positions of the bicycle. If the umbrella is to be fastened at a single point, a middle portion of the umbrella should be supported by a support member attached to the bicycle in consideration of the gravity center of the umbrella. However, the umbrella includes movable components in the middle portion thereof and it is therefore difficult to firmly fasten the umbrella to the bicycle. In addition, the umbrella supported at the single point is liable to rotate, so that the umbrella may come off during the traveling of the bicycle.

Further, the provision of the two support members at the two different positions of the bicycle ensures smooth movement of movable components of the bicycle during the operation of the bicycle. More specifically, where the support members are respectively attached to the seat stay and the frame bar, the umbrella can be fastened to the bicycle so as to be accommodated within a major component frame of the bicycle. Therefore, the umbrella is not partially brought into contact with the movable components of the bicycle, so that the umbrella will not interfere with the operation of the bicycle. Further, the umbrella does not hinder a rider from getting on and off the bicycle, and the rider can pedal the bicycle in the same manner as when the umbrella is not mounted on the bicycle. Where the support members are respectively attached to a handlebar and a front wheel fork of the bicycle to vertically support the umbrella, smooth movement of the handlebar cannot be ensured for steering of the bicycle. Further, the distance between the support members is short so that the handle of the umbrella projects above the handlebar of the bicycle to a considerable extent. If the rider encounters a collision on the bicycle or suddenly applies a brake in an emergency to lean forward, the rider may injure his face or head. Therefore, such an arrangement is dangerous. In addition, the positions where the support members are to be attached are limited and, therefore, the attaching positions cannot flexibly be changed depending on the type of the bicycle and the length of the umbrella. Accordingly, it is difficult for such an arrangement to be applied to a small-size bicycle or to a short umbrella.

The support portion of the distal portion support member to be attached to the seat stay is preferably formed of a resilient resin or a rubber material, and the fastening portion thereof is preferably formed of a synthetic resin or a metal. The support portion preferably has a cylindrical shape, and is formed with an opening for receiving the distal portion, particularly the ferrule of the umbrella at its center. The opening preferably has a diameter gradually decreasing toward an exit side thereof for supporting the ferrule of the umbrella. To ensure that the umbrella support attachment can widely be applied to bicycles of any configurations, the distal portion support member is preferably constructed such that the angle formed between the support portion and the fastening portion can properly be adjusted.

The clipping portion of the proximal portion support member to be attached to the frame bar is formed of a synthetic resin or a metal. The clipping portion is preferably adapted to clamp a proximal portion, particularly a handle of the umbrella like a clip to prevent displacement of the umbrella. To ensure that the umbrella support attachment can be applied to bicycles of any configurations, the proximal portion support member is preferably constructed such that the angle formed between the clipping portion and the fastening portion can properly be adjusted.

Although the umbrella support attachment of the present invention is constructed such that the fastening portions are attached to the frame of the bicycle, the fastening portions may be provided as parts of the frame of the bicycle so that the support portion and the clipping portion can respectively be attached to the fastening portions. Therefore, in accordance with another aspect of the present invention, the umbrella support attachment is constructed such that the fastening portion of the distal portion support member and the fastening portion of the proximal portion support member are provided as parts of the frame of the bicycle, and the support portion of the distal portion support member and the clipping portion of the proximal portion support member are attached to the fastening portion of the distal portion support member and the fastening portion of the proximal portion support member, respectively.

Further, the support member to be attached to the frame bar may be provided with a lock or the like to effectively prevent the theft of an umbrella. Therefore, in accordance with further another aspect of the present invention, the umbrella support attachment is constructed such that the proximal portion support member to be attached to the frame bar is provided with a lock.

The type of the lock is not particularly limited, but a dial lock is conveniently used because it has a small size and can be incorporated in the clipping portion. Further, the dial lock does not require a key and, therefore, is advantageous in terms of a space requirement.

The present invention is characterized in that an elongate object such as an umbrella can horizontally be mounted on a side of the bicycle. Therefore, the umbrella support attachment otherwise includes fastening portions to be respectively attached to the frame bar and the seat stay of the bicycle, and a support portion connected to the fastening portions for holding the umbrella. The configuration of the support portion and the way of holding the umbrella are not particularly limited. For example, the support portion may be an elongate cylindrical holder in which the umbrella can entirely be accommodated. In such a case, to attain the object of the present invention, the holder has fastening portions provided at opposite end portions thereof for attaching the holder to the frame bar and the seat stay. Therefore, in accordance with still another aspect of the present invention, there is provided an umbrella support attachment for a bicycle, which comprises a generally cylindrical holder for holding a handle-to-ferrule portion of an umbrella, and fastening members provided at opposite end portions of the cylindrical holder and adapted to be attached to a seat stay and a frame bar of the bicycle.

The umbrella support attachment according to the present invention can be used for almost all types of bicycles, and can assuredly fasten an umbrella of any type to a bicycle without interfering with operation of the bicycle and smooth movement of movable components of the bicycle. The present invention also provides a bicycle provided with the umbrella support attachment.

Besides the bicycle provided with the umbrella support attachment, a bicycle having support portions provided on its frame for supporting distal and proximal portions of an umbrella can also carry the umbrella thereon without interfering with operation of the bicycle and smooth movement of movable components of the bicycle. Therefore, in accordance with further another aspect of the present invention, there is provided a bicycle which comprises a support member provided on a seat stay thereof for supporting a ferrule of an umbrella, and a clipping portion provided on a frame bar thereof for supporting a handle of the umbrella.

DESCRIPTION OF THE PREFERRED EMBODIMENTS

The type of the bicycle to which the umbrella support attachment of the present invention is to be attached is not particularly limited. Since the umbrella support attachment is attached to a seat stay and a frame bar of the bicycle, the umbrella support attachment cannot be applied to a bicycle having no such frame portions. Only a few types of bicycles do not have the seat stay and the frame bar and, therefore, the umbrella support attachment of the present invention can be applied to almost all bicycles without any trouble. However, a shopping tricycle, for example, does not have a seat stay so that the umbrella support attachment of the present invention cannot be applied thereto.

Figure 1:
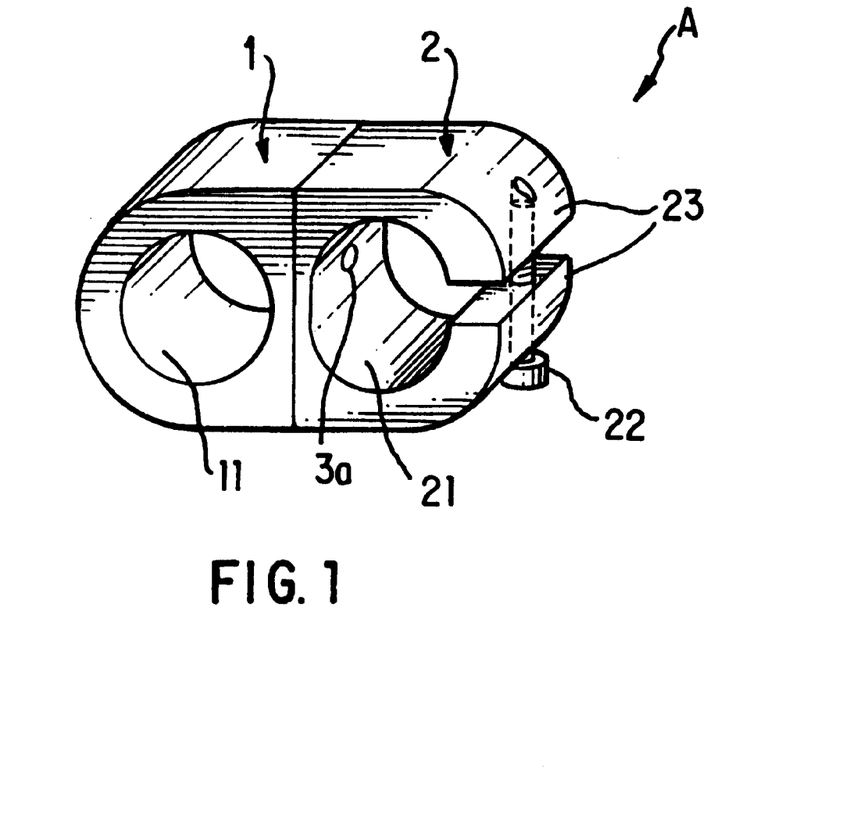
FIG. 1 is a perspective view illustrating one exemplary distal portion support member.
Figure 2:
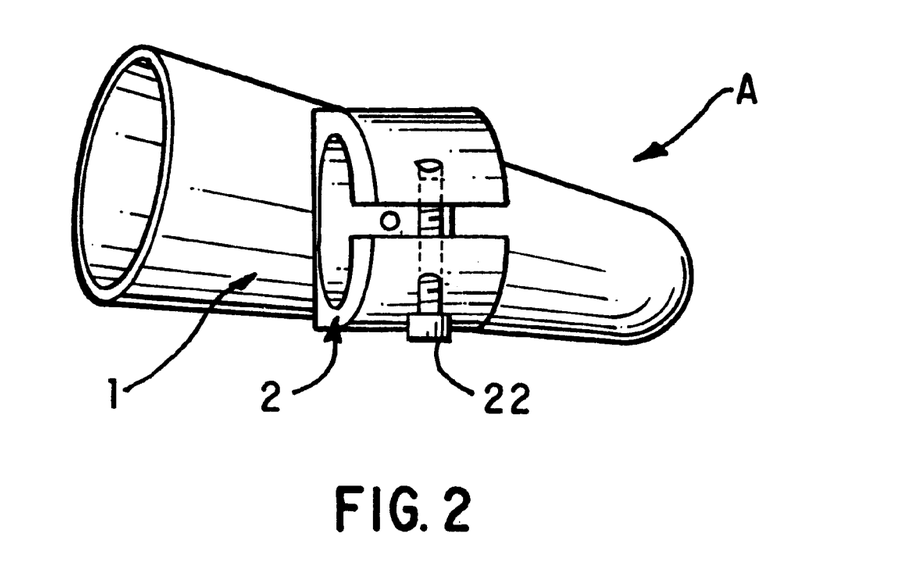
FIG. 2 is a perspective view illustrating another exemplary distal portion support member.

The umbrella support attachment comprises a distal portion support member A and a proximal portion support member B. The distal portion support member A includes a fastening portion to be attached to the seat stay and a support portion for supporting a ferrule of an umbrella or the like, and preferably has a configuration as shown in FIG. 1. The configuration of the distal portion support member A is not limited to that shown in FIG. 1, but may otherwise be of a holder type as shown in FIG. 2. As long as the distal portion support member A has the support portion for supporting the ferrule and the fastening portion to be attached to the frame, the configuration thereof is not particularly limited.

In FIG. 1, reference numerals 1 and 2 denote the support portion and the fastening portion, respectively, of the distal portion support member A. The support portion 1 has an opening 11 for receiving the ferrule of the umbrella. From the viewpoint of umbrella handling and umbrella support stability, it is preferred that the opening 11 has a diameter gradually decreasing from an entrance side thereof to an exit side thereof. The fastening portion 2 includes a fixer 23 for fixing the support member A to the seat stay. The fixer 23 preferably has a variable gap which is adjustable in accordance with the diameter of the seat stay of the bicycle. The fixer 23 has an opening 21 preferably having a circular or elliptical configuration in section. The fixer 23 includes a screw 22 for fixing the fixer 23.

The frames of bicycles widely differ in configuration. To ensure that the umbrella support attachment can be applied to any of various types of bicycles, the support member A is preferably constructed such that an angle formed between the support portion 1 and the fastening portion 2 can properly be adjusted. To this end, the support portion 1 is preferably connected to the fastening portion 2 by a single screw or by a ball bearing so as to be rotated with respect to the fastening portion 2. In FIG. 1, the support portion 1 and the fastening portion 2 are connected to each other by a connector (e.g. screw) 3a.

It is noted that the support portion 1 and the fastening portion 2 are not necessarily discrete components, but may be an integral component.

Figure 3:
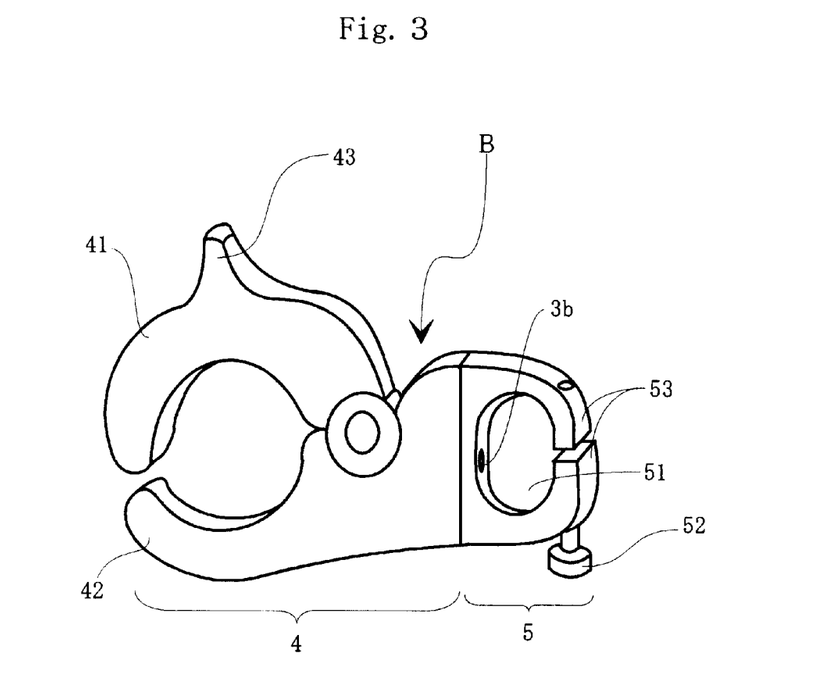
FIG. 3 is a perspective view illustrating one exemplary proximal portion support member.

The proximal portion support member B includes a fastening portion to be attached to the frame bar and a clipping portion for supporting the handle of the umbrella, and preferably has a configuration as shown in FIG. 3. The configuration of the proximal portion support member B is not limited to that shown in FIG. 3. As long as the proximal portion support member B has the clipping portion for supporting the handle of the umbrella and the fastening portion to be attached to the frame, the configuration thereof is not particularly limited. The fastening portion may be provided as part of the frame of the bicycle. The clipping portion preferably has a generally circular configuration to support the umbrella handle which typically has a circular cross section, but the configuration thereof is not limited thereto. As long as the clipping portion can prevent the umbrella from readily coming off, the clipping portion is configured in any way. In FIG. 3, reference numerals 4 and 5 denote the clipping portion and the fastening portion, respectively, of the proximal portion support member B. As shown in FIG. 3, the clipping portion 4 has a movable clip piece 41 and a stationary clip piece 42 for holding the umbrella handle. For convenience of handling of the clipping portion 5, one of the clip pieces is stationary. The movable clip piece 41 has a projection 43 for convenience of opening and closing of the movable clip piece 41. The fastening portion 5 includes a fixer 53 for fixing the support member B to the frame bar. The fixer 53 preferably has a variable gap which is adjustable in accordance with the diameter of the frame bar of the bicycle. The fixer 53 has an opening 51 preferably having a circular or elliptical configuration in section. The fixer 53 includes a screw 52 for fixing the fixer 53.

The frames of bicycles widely differ in configuration. To ensure that the umbrella support attachment can be applied to any of various types of bicycles, the support member B is preferably constructed such that an angle formed between the clipping portion 4 and the fastening portion 5 can properly be adjusted. To this end, the clipping portion 4 is preferably connected to the fastening portion 5 by a single screw or by a ball bearing so as to be rotated with respect to the fastening portion 5. In FIG. 3, the clipping portion 4 and the fastening portion 5 are connected to each other by a connector (e.g. screw) 3b.

It is noted that the clipping portion 4 and the fastening portion 5 are not necessarily discrete components, but may be an integral component.

Figure 4:
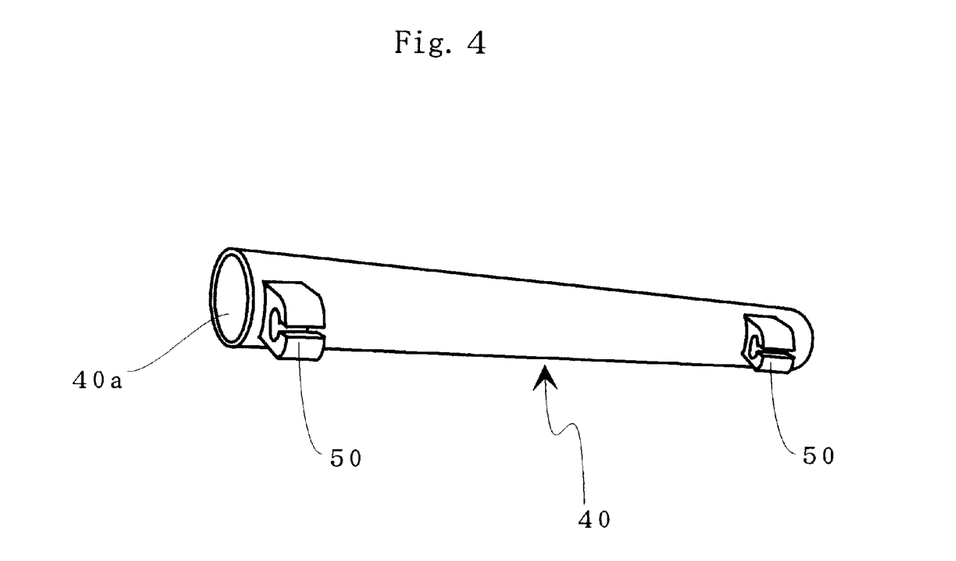
FIG. 4 is a perspective view illustrating an umbrella support attachment employing a generally cylindrical holder according to one embodiment of the present invention.

FIG. 4 shows an umbrella support attachment for a bicycle according to one embodiment of the present invention, which includes a generally cylindrical holder for holding a handle-to-ferrule portion of an umbrella, and fastening members provided at opposite end portions of the cylindrical holder and adapted to be respectively attached to a seat stay and a frame bar of the bicycle. In FIG. 4, reference numerals 40 and 50 denote the cylindrical holder as a support member and the fastening members, respectively, of the umbrella support attachment. The umbrella support attachment having such a construction is designed such that the umbrella is inserted from an end 40a of the holder 40. The umbrella support attachment of this type is attached to the bicycle by respectively attaching the fastening members 50 to the frame of the bicycle, and supports the umbrella inserted into the holder 40 from the end 40a. In accordance with another embodiment, the umbrella support attachment of the cylindrical holder type may be constructed such that the holder is longitudinally divided into upper and lower halves either of which is openable, serving as a lid.

FIG. 5 illustrates a state where the umbrella is fastened to the bicycle by using the umbrella support attachment of the present invention. In FIG. 5, reference numerals 6, 7 and 8 denote the umbrella, the seat stay and the frame bar, respectively. Where the umbrella support attachment is to be attached to the seat stay and the frame bar, it is necessary to flexibly determine the attaching positions on the seat stay and the frame bar depending on the size of the bicycle and the length of the umbrella. More specifically, the distal portion support member A is first attached to the seat stay, and then the position on the frame bar where the proximal portion support member B is to be attached is determined. Thus, the attaching position can readily be determined. Since the attaching position of the proximal portion support member B is changed depending on the length of the umbrella to be mounted, the screw 52 of the fastening portion 5 is preferably a wing screw for convenience of changing the attaching position. The fastening portions may be attached to the frame of the bicycle with the use of magnets.

Figure 6:
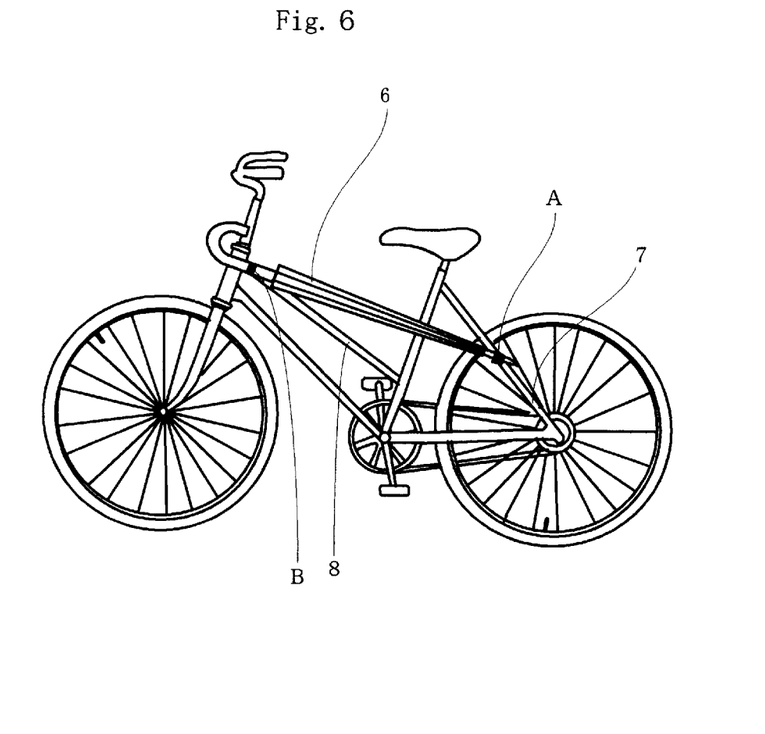
FIG. 6 is a front view illustrating a state where an umbrella is fastened to a bicycle by using an umbrella support attachment with its distal portion support member attached to an upper portion of a seat stay of the bicycle.

It is preferred that the distal portion support member A is attached at the lowest possible position of the seat stay. If the support member A is attached at an upper position of the seat stay, the umbrella is supported above the frame bar as shown in FIG. 6, thereby hindering a rider from getting on and off the bicycle. If a short umbrella is to be mounted, however, the umbrella may interfere with the pedaling of the bicycle so that the distal portion support attachment A should be attached at a relatively upper position of the frame bar.

Figure 7:
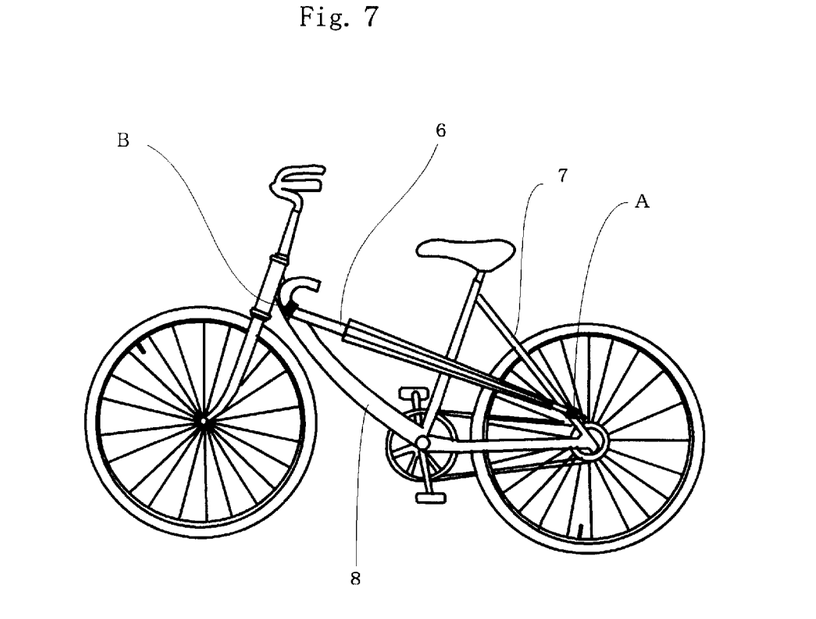
FIG. 7 is a front view illustrating a state where an umbrella is fastened to a bicycle of a single frame bar type by using an umbrella support attachment according to the present invention.
Figure 8:
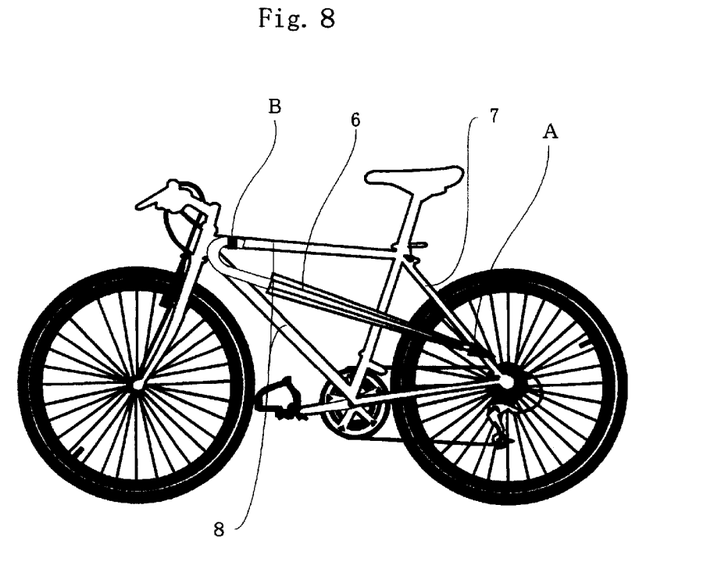
FIG. 8 is a front view illustrating a state where an umbrella is fastened to a bicycle of a sport type by using an umbrella support attachment according to the present invention.

As described above, the umbrella support attachment of the present invention can be applied to almost all types of bicycles. For example, the umbrella support attachment can be attached to a bicycle of a single frame bar type as shown in FIG. 7 or a bicycle of a sport type as shown in FIG. 8. In such a case, the attaching position of the umbrella support attachment is preferably determined so as not to interfere with the pedaling of the bicycle.

EMBODIMENT

The present invention will hereinafter be described by way of an embodiment thereof. It should be understood, however, that the embodiment be not limitative of the invention.

Figure 9:
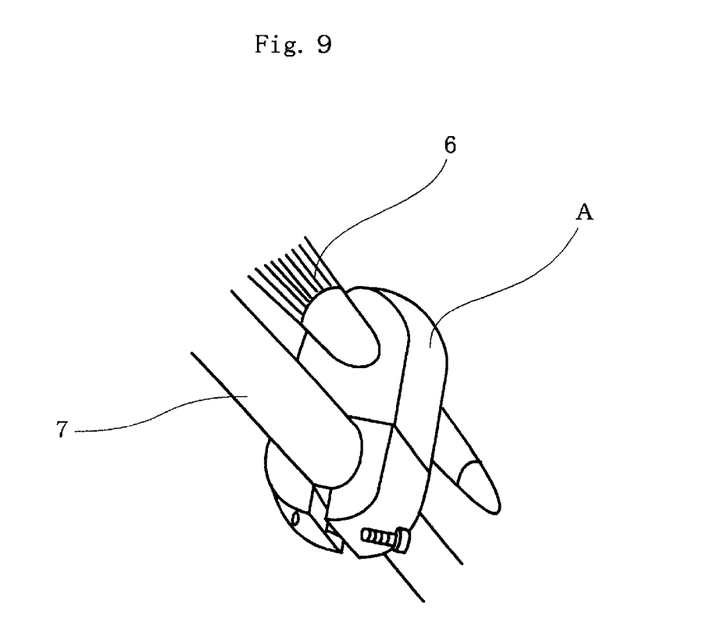
FIG. 9 is a perspective view illustrating a state where a distal portion support member is attached to a seat stay of a bicycle.

A distal portion support member A having a configuration as shown in FIG. 1 was employed. A support portion 1 of the distal portion support member A had an opening 11 having an entrance diameter of 20 mm and an exit diameter of 15 mm so that the diameter of the opening linearly decreased from the entrance side to the exit side. The distal portion support member A was attached at the lowest position of a seat stay of a bicycle. FIG. 9 is an enlarged view illustrating a state where the distal portion support member A was attached to the seat stay. In FIG. 9, like reference numerals denote like components previously described. The distal portion support member A was attached so that the support portion 1 faced upward as shown in FIG. 9.

Figure 10:
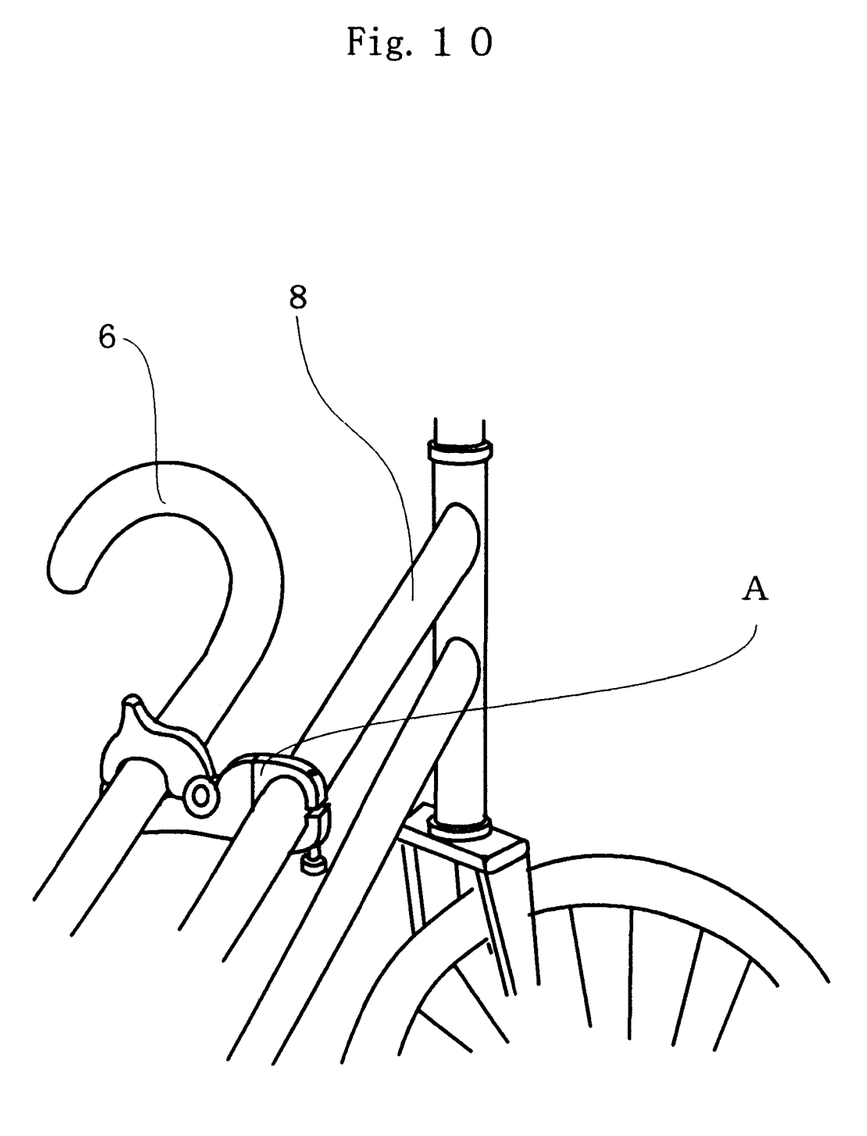
FIG. 10 is a perspective view illustrating a state where a proximal portion support member is attached to a frame bar of a bicycle.

A proximal portion support member B having a construction as shown in FIG. 3 was employed. The proximal portion support member B was temporarily fastened to the frame bar, and then the umbrella was supported by the umbrella support attachment with its ferrule supported by the distal portion support member A. Thereafter, the proximal portion support member B was moved to a position where the handle of the umbrella could be supported by the proximal portion support member B, and then firmly fastened at this position. FIG. 10 is an enlarged view illustrating a state where the proximal portion support member B was attached to the frame bar. In FIG. 10, like reference numerals denote like components previously described.

Thus, the distal portion support member A and the proximal portion support member B were attached to the bicycle, and the umbrella was mounted on the bicycle as shown in FIG. 5. The umbrella thus mounted on the bicycle with the use of the umbrella support attachment of the present invention did not interfere with the operation of the bicycle nor come off during the traveling of the bicycle. Further, the umbrella did not hinder a rider from getting on and off nor interfere with smooth movement of movable components such as pedals and a handlebar of the bicycle.

The umbrella support attachment of the present invention allows an umbrella to be mounted on a bicycle for carriage thereof without interfering with the operation of the bicycle and smooth movement of the movable components of the bicycle. Regardless of the construction of a bicycle and the size of an umbrella, the umbrella support attachment allows any types of umbrellas to be mounted on any types of bicycles.

What is claimed is:

1. An umbrella support attachment for supporting an umbrella on a bicycle, comprising:

a distal portion support member including a fastening portion attachable to a seat stay of the bicycle and a support portion for supporting a distal portion of the umbrella, wherein said fastening portion of the distal portion support member has a fixer attachable to said seat stay, and said fixer comprises an opening which is adjustable in accordance with a diameter of the seat stay of the bicycle and a screw provided through the opening for attaching said fixer to said seat stay; wherein said support portion of the distal portion support member comprises an opening for receiving a ferrule of the umbrella, and a diameter of the opening of the support portion decreases gradually from an entrance side thereof to an exit side thereof; and wherein the fastening portion and the support portion of said distal portion support member are rotatably connected by a connector; and a proximal portion support member including a fastening portion attachable to a frame bar of the bicycle and a clipping portion for supporting a proximal portion of the umbrella; wherein said fastening portion of the proximal portion support member has a fixer to be attached to the frame bar, and said fixer comprises an opening which is adjustable in accordance with a diameter of the frame bar of the bicycle and a screw provided through the opening for attaching said fixer to the frame bar; wherein said clipping portion of the proximal support member comprises a movable clip piece and a stationary clip piece for supporting a handle of the umbrella; and wherein the fastening portion and the clipping portion of the proximal portion support member are rotatably connected by a connector.

2. An umbrella support attachment for a bicycle as set forth in claim 1, wherein at least one of the connectors is a screw.

3. An umbrella support attachment for a bicycle as set forth in claim 1, wherein the movable clip piece in the clipping portion of the proximal support member has a projection for opening and closing the movable clip piece.

* * * * *